Dec. 28, 1965 A. F. BALL 3,225,465
REINFORCED HEEL AND DOWEL
Filed Aug. 14, 1964
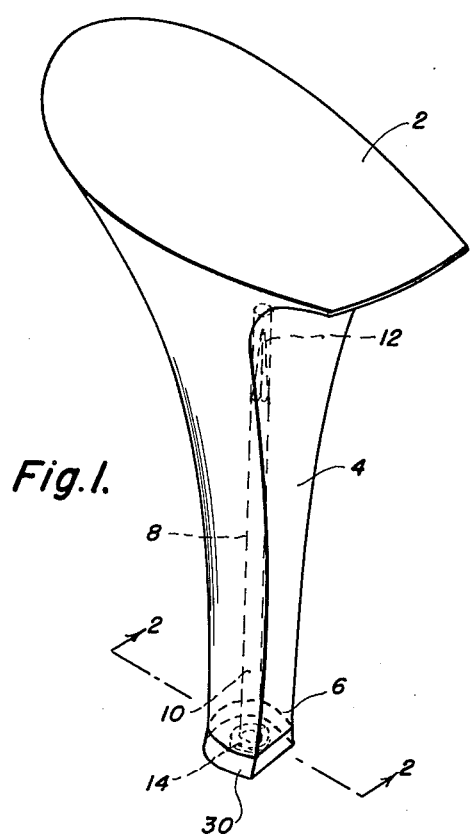
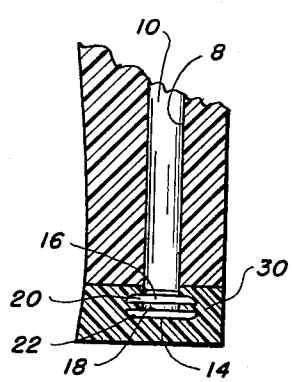
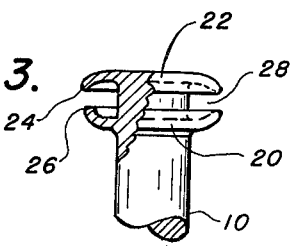
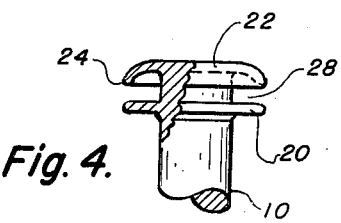
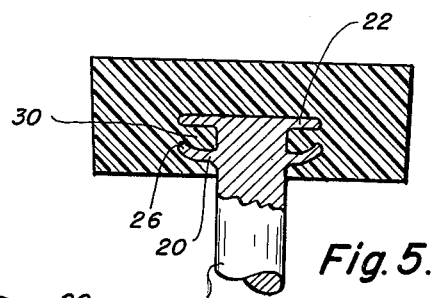
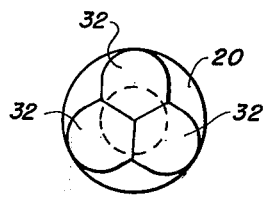
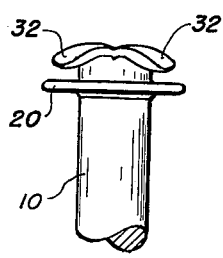
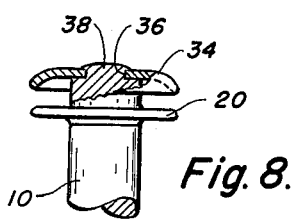
Inventor
Arthur F. Ball
by Rines and Rines
Attorneys United States Patent Office 3,225,465
Patented Dec. 28, 1965

3,225,465
REINFORCED HEEL AND DOWEL
Arthur F. Ball, Haverhill, Mass., assignor to Essex Products, Inc., Haverhill, Mass., a corporation of Massachusetts
Filed Aug. 14, 1964, Ser. No. 389,572
8 Claims. (Cl. 36—34)

The present invention relates to reinforced heels of plastic or other weak materials, and to reinforcing dowels therefor. The invention is particularly related to heels, for use in women's shoes, of relatively very small cross section, and that terminate in small tread ends provided with top lifts.

Heels of the above-described character are exceedingly weak, wherefore, in order to prevent fracture thereof, during use, they have been strengthened by reinforcing dowels. The tread ends of the reinforcing dowels have extended beyond the tread ends of the plastic body portions of the heels, and top lifts have been secured to these extending tread ends of the reinforcing dowels. The top lifts have been constituted of rubber or similar resilient, though tough, materials, but, owing to their extremely small size, it has been most difficult to fasten them to the reinforcing dowels securely enough to prevent their becoming kicked off, as when the wearer strikes an obstruction, during walking. Many attempts have been made by numerous manufacturers to solve this problem.

A very efficient solution of the problem is described in the applicant's Letters Patent 3,106,791, issued October 15, 1963, entitled, "Reinforcing Heel Insert and Heel." It has been found, however, that, under extraordinary conditions of wear, as when the top lift becomes jammed into some crevice, it does occasionally become separated from the heel.

An object of the present invention, therefore, is to improve upon the heel, and the reinforcing dowel, together with the mechanics of the top-lift-securing means that are disclosed in the said Letters Patent.

Other and further objects will be explained hereinafter and will be particularly pointed out in the appended claims.

To the attainment of the above ends, a feature of the invention resides in providing the extending tread end of the reinforcing dowel with two transversely disposed heads or projections, preferably of substantially the same dimension on their outer peripheries, with one of the projections converging from the stem of the dowel toward the other, or preferably both projections converging toward each other, to a degree such that the outer peripheries of the projections become positioned very close to each other, thereby to provide a locking pocket between the projections. The top lift is molded or otherwise embedded about the said extending tread end of the reinforcing dowel, including the two projections, with the result that the portion of the top lift that is disposed between the projections, which is a very substantial portion, becomes thus locked so very securely in the locking pocket between the projections that, with the employment of a suitable tough, though resilient, material for the top lift, it requires most unusual stresses to dislodge the top lift from its anchorage on the said extending tread end of the reinforcing dowel.

The two projections or heads may be constituted of circular discs that may be provided upon the said extending tread end of the dowel. They may, for example, be integrally formed at the time of manufacturing the dowel itself.

It is preferred, however, to form the inner projection only integrally in this manner. The outer projection may be provided with an opening into which the said tread end of the dowel may be inserted and riveted over against the said outer projection.

As a modification, the outer projection may be constituted of separated elements of a discontinuous disc.

The invention will now be described in connection with the accompanying drawings, in which:

FIG. 1 is a perspective of a heel constructed in accordance with the present invention;

FIG. 2 is a fragmentary enlarged longitudinal section, taken upon the line 2—2 of FIG. 1;

FIG. 3 is a further enlarged fragmentary elevation, partly in section, of a reinforcing dowel embodying the present invention;

FIG. 4 is a similar view of a modification;

FIG. 5 is a similar view of a further modification, with the tread end of the reinforcing dowel shown embedded in a top lift, shown in section;

FIG. 6 is an enlarged underside plan of a further modified reinforcing dowel;

FIG. 7 is a fragmentary side elevation of the same; and

FIG. 8 is a similar elevation of still another modification, partly in longitudinal section.

The reinforced heel that is illustrated by FIG. 1 is shown having a body portion of relatively weak material, such as plastic, provided with a relatively large heel-seat end 2, a stem 4 of relatively small cross-section, and a relatively small tread end 6. The body portion is interiorly provided with a recess 8 extending longitudinally from the tread end 6 to near the heel-seat end 2. An elongated reinforcing dowel 10, constituted of material, such as steel, that is much harder than that of the body portion, is shown provided with a sharp heel-seat end 12 and a tread end 14. Except for the tread end 14, the reinforcing dowel 10 is driven into the recess 8 to a point near the heel-seat end 2 of the body portion, as shown by dashed lines in FIG. 1. The tread end 14 of the reinforcing dowel 10, therefore, extends downward, beyond the body portion, as shown in FIGS. 1 and 2.

This downwardly extending tread end 14 is shown provided with two transversely disposed projections 20 and 22 of substantially the same peripheral dimension shown at 16 and 18, FIG. 2, slightly longitudinally displaced from each other. One of the projections is shown in FIGS. 4 to 8, inclusive, converging from the stem of the dowel 10 toward the other projection to a degree such that the peripheries of the projections or heads 20 and 22 become positioned relatively close to each other. In the modification of FIG. 4, this convergence is shown at 24, on the outer projection or head 22. In the modification of FIG. 5, it is shown at 26, on the inner projection or head 20. It is preferred, however, that the peripheries of both heads 20 and 22 converge toward each other, as shown at 24 and 26 in FIGS. 2 and 3. The convergence of the projections 20 and 22 is preferably concave toward each other. In all cases, a locking pocket 28 becomes thus provided between the projections 20 and 22, the locking effect of which is increased by the said concavity of the convergence of the projections 20 and 22.

The said extending tread end of the reinforcing dowel 10, including the heads or projections 20 and 22, is next embedded in a top lift 30 of tough rubber, plastic or other suitable material. A substantial portion of the material of the top lift 30 becomes thus embedded in the pocket 28.

It has been found, on test, that, by this construction, it becomes almost impossible to dislodge the top lift 30 from the heel.

The projections or heads 20 and 22 are illustrated in FIGS. 2 to 5, inclusive, as uninterrupted circular discs integral with the stem of the reinforcing dowel 10. This is the construction that is illustrated also in FIGS. 6 and for the inner projection 20. The outer projection of FIGS. 6 and 7, however, is shown slightly modified, as constituted of three separate elements or flaps 32, which may be produced by driving a sharp tool (not shown) into the free end of the tread end of the dowel 10, and prying these flaps 32 apart away from the tool. The three elements or flaps 32 may, of course, be replaced by two, four or any other suitable number.

According to the preferred embodiment that is illustrated by FIG. 8, however, though the inner projection 20 may be of the same construction as before described, the outer projection, designated by the numeral 34, is shown constituted of a separate disc or washer, provided with a central opening 36. It may, for example, be manufactured out of sheet metal on a stamping press. The extreme free end 38 of the said tread end of the dowel is shown reduced in diameter, to fit into the opening 36. After insertion in the opening 36, it is riveted over against the washer projection 34, as illustrated. As before stated, according to the preferred embodiment of the invention, though not so shown in FIG. 8, the outer washer projection 34 and the inner projection 20 are both concavely converged toward each other, as described above, and as is illustrated by FIGS. 2 and 3 at 24 and 26.

A simpler construction is thus provided by the modification that is illustrated by FIG. 8 that, however, has all the advantages above described.

Further modifications will occur to persons skilled in the art, and all such are considered to fall within the spirit and scope of the present invention, as defined in the appended claims.

What is claimed is:

1. A reinforced heel having a body portion of relatively weak material provided with a relatively large heel-seat end, a stem of relatively small cross-section, and a relatively small tread end, the body portion being interiorly provided with a recess extending longitudinally from the tread end to near the heel-seat end, an elongated reinforcing dowel constituted of material much harder than that of the body portion provided with a heel-seat end and a tread end, the reinforcing dowel, except for its tread end, being driven into the recess to a point near the heel-seat end of the body portion, whereby the tread end of the dowel extends beyond the body portion, the extending tread end of the dowel being provided with two projections rigidly extending transversely from the stem of the dowel and one of which converges from the stem of the dowel toward the other to a degree such that the outer peripheries of the projections become positioned relatively close to each other, thereby to provide a locking pocket between the projections, at least the projection closer to said heel-seat end being integral with the stem of the dowel, and a top lift in which the said extending tread end of the dowel, including the two projections, is embedded, whereby a substantial portion of the material of the top lift becomes embedded in the locking pocket.

2. The heel of claim 1, wherein said projections have substantially the same outer dimension.

3. The heel of claim 1, wherein the projection farther from said heel-seat end is provided with an opening into which the tread end of the dowel is inserted and riveted over against the last-mentioned projection.

4. The heel of claim 1, wherein one of the projections is constituted of separate elements.

5. A reinforcing dowel for use in a heel of the type having a body portion of relatively weak material provided with a relatively large heel-seat end, a stem of relatively small cross-section, and a relatively small tread end, and having the body portion interiorly provided with a recess extending longitudinally from the tread end to near the heel-seat end, said dowel having a heel-seat end and a tread end and, except for its tread end, being adapted to be driven into said recess to a point near the heel-seat end of said body portion, said dowel being composed of a hard material and provided at its tread end with two projections rigidly extending transversely from the stem of the dowel and one of which converges from the stem of the dowel toward the other to a degree such that the outer peripheries of the projections become positioned relatively very close to each other, thereby to provide a locking pocket between the projections, at least the projection closer to the heel-seat end of the dowel being integral with the stem of the dowel, said tread end of the dowel being adapted to be embedded in a top lift, whereby a substantial portion of the material of the top lift will become embedded in the locking pocket.

6. The dowel of claim 5, wherein said projections have substantially the same outer dimension.

7. The dowel of claim 5, wherein the projection farther from the heel-seat end of the dowel is provided with an opening into which the tread end of the dowel is inserted and riveted over against the last-mentioned projection.

8. The dowel of claim 5, wherein one of the projections is constituted of separate elements.

References Cited by the Examiner
UNITED STATES PATENTS

| | | | |
|---|---|---|---|
| 3,041,744 | 7/1962 | Brauner | 36—34 |
| 3,055,125 | 9/1962 | Ronci | 36—34 |
| 3,074,186 | 1/1963 | Gudermuth | 36—34 |
| 3,141,248 | 7/1964 | Harris | 36—34 |

FRANK J. COHEN, *Primary Examiner.*